Aug. 30, 1938. W. T. HONISS 2,128,249
APPARATUS FOR AND METHOD OF FEEDING MOLTEN GLASS
Filed Dec. 30, 1935 2 Sheets-Sheet 2
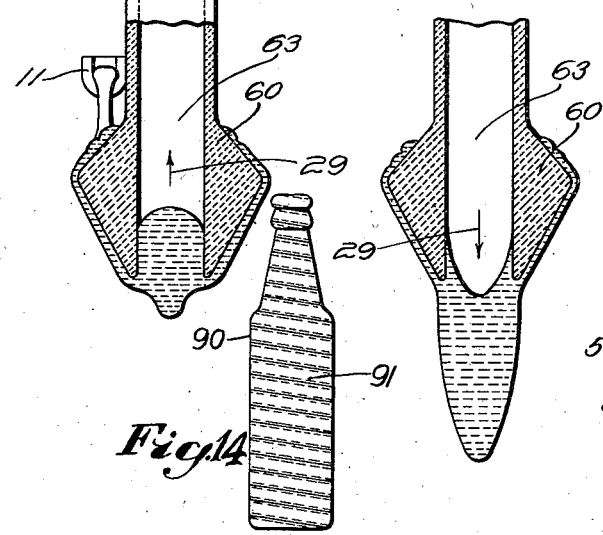
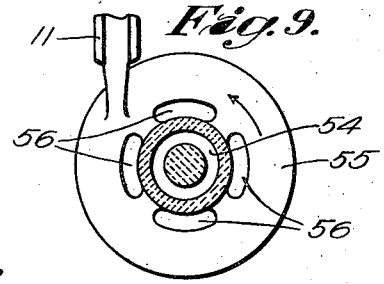
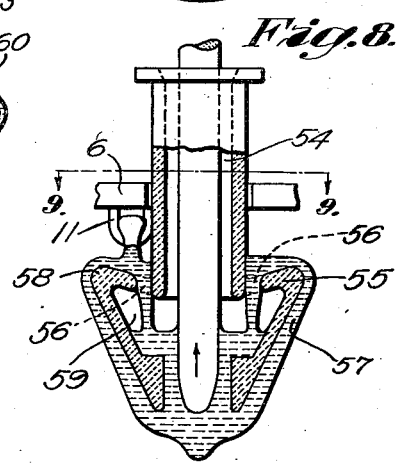
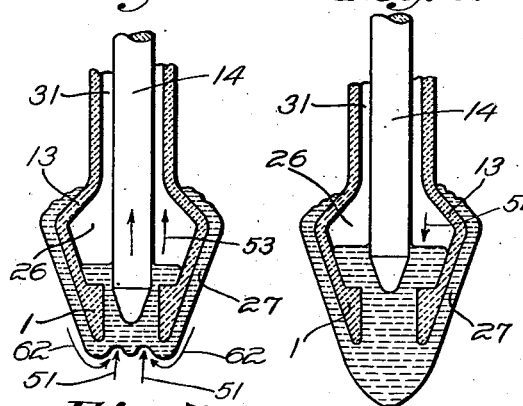
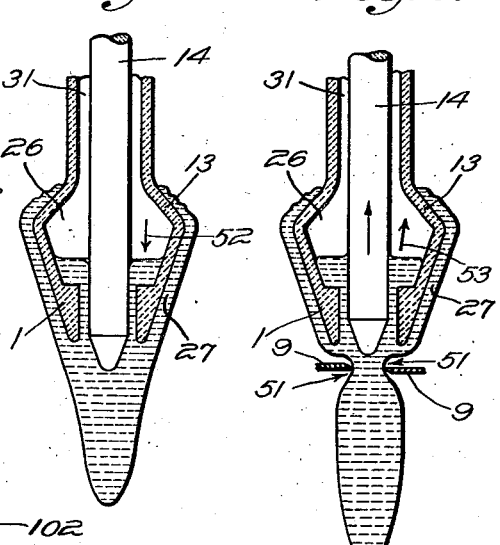
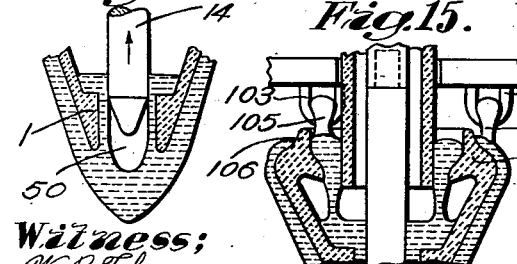
Inventor;
William T. Honiss
by Brown + Parlam
Attorneys
Witness;
W. B. Thayer.

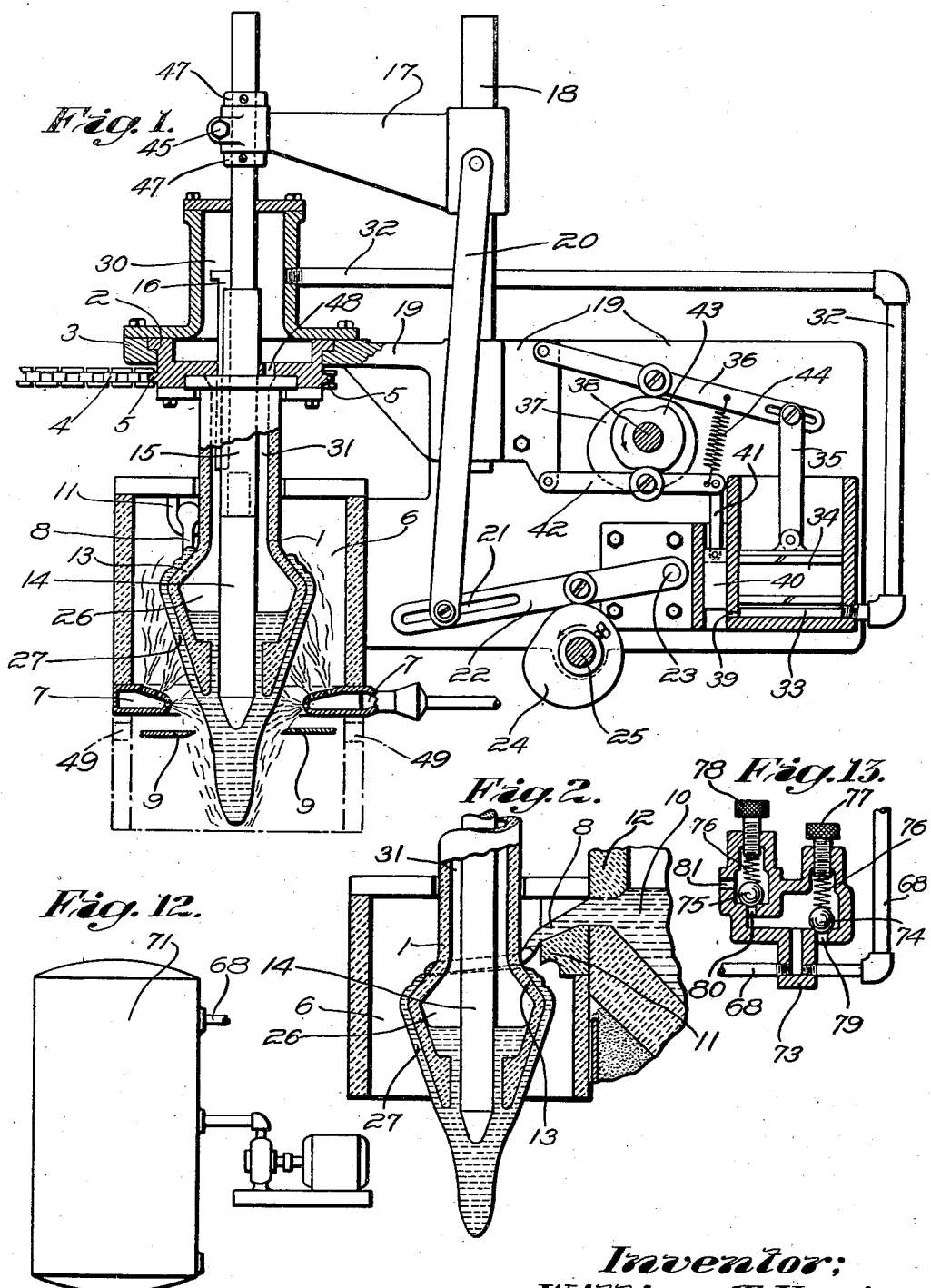
Aug. 30, 1938. W. T. HONISS 2,128,249
APPARATUS FOR AND METHOD OF FEEDING MOLTEN GLASS
Filed Dec. 30, 1935 2 Sheets-Sheet 1
Inventor;
William T. Honiss
by Brown & Parham
Attorneys
Witness:
W. B. Thayer.

UNITED STATES PATENT OFFICE 2,128,249

APPARATUS FOR AND METHOD OF FEEDING MOLTEN GLASS

William T. Honiss, West Hartford, Conn., assignor to Hartford-Empire Company, Hartford, Conn., a corporation of Delaware Application December 30, 1935, Serial No. 56,606

32 Claims. (Cl. 49—55)

This invention relates to improvements in apparatus for and methods of feeding molten glass from a supply body thereof, as for example from the customary melting tanks or forehearth extensions thereof, in mold charges of suitable weights, shapes and condition for fabrication into articles of glassware of improved quality.

A general ultimate object of this invention is to produce glassware, especially hollow glassware such as bottles, jars and other articles, of greater and more uniform resistance to breakage, better quality and appearance, making their walls of more uniform thickness, avoiding strains due to unequal thickness or other causes, and allowing the walls to be made thinner, thereby avoiding unnecessary waste of glass, and making ware of lighter weights and equal or greater strength, or at least without sacrificing strength.

An object of the invention is to produce mold charges of more uniform temperature and viscosity, without the customary unevenly chilled outer skins, or if desired, without any skin, thus expediting and otherwise facilitating their conversion into glassware having walls of the desired uniform thickness or thinness.

Another object of the invention is to eliminate blemishes, such as "brush marks", wrinkles, striations and abrasions which frequently occur in the structure or on the surface of ware made by present methods.

A still further and important object of the invention is to eliminate or widely disperse and thus reduce the intensity of strains in the ware due to the presence in the charges of cords and glass that has been contaminated by clay or other foreign or unhomogeneous substances which are always present to a greater or less extent in glass melted by present commercial methods. These appear to constitute, in effect, a kind of grain in the ware, comparable with the grain of wood, paper and rolled metals. In present methods of melting glass and forming it into glassware, this grain is unavoidably disposed in lines or zones extending lengthwise of the direction of flow of the molten glass and likewise lengthwise of the resultant ware, thus producing localized strains or lines of weakness in the ware, tending to cause or allow it to split or rupture lengthwise with the grain, under shock or bursting pressure.

It is a well recognized physical theory and fact that hollow glassware, even when made of homogeneous glass free from "grain" or strains will, like less frangible hollow vessels such as steam boilers, due to their form alone, almost invariably be split or ruptured along approximately longitudinal lines at about half the shock or bursting pressure that would theoretically be required to split or rupture the same ware or vessel along peripheral or circumferential lines. When, as the result of present methods, such strains occurring in the ware extend lengthwise thereof, they augment its normal tendency to split lengthwise under pressure or shock by guiding the fractures in that direction.

In the present invention such undesirable aid to normal tendency is avoided, opposed or diverted, by feeding the glass and forming mold charges therefrom by a method whereby such grain, and whatever strains in the ware may result therefrom, are widely and thinly dispersed and strains avoided or reduced in intensity by disposing them peripherally around the ware instead of lengthwise thereof, so that the ware in exercising its normal tendency to split lengthwise, must split across the peripheral line or repeated lines of grain or strain. Any tendency to split along such peripheral lines is adequately opposed by its greater normal resistance thereto, which according to the theory above referred to, is twice its normal resistance to splitting lengthwise. Structurally the resultant ware is comparable with a barrel made of continuous spiral hoops instead of being made of imperfectly connected lengthwise staves.

Most or all of the glassware faults herein referred to are well known, but the causes, especially of those faults which appear to originate in the melting tank and feeder conduits, are somewhat obscure. The depth of the melting glass, its intense heat and its necessary enclosure in opaque refractory walls, and other conditions make accurate diagnosis of those causes very difficult. Therefore, since the present invention deals so intimately with the causes and cure of those faults, it seems desirable and pertinent to preface description of the invention with a brief description of those faults and their causes.

In commercial practice glass is commonly melted continuously in a large body, usually two feet or more in depth and several feet in width, flowing slowly lengthwise by gravity through long rectangular melting furnaces known as "tanks", the walls of which, although built of thick refractory clay blocks cast or burned at high temperature, are eroded, washed into and carried along by the moving glass until the walls become too thin for safety. A large proportion of the eroded clay, being inseparable from the glass, flows therewith and becomes incorporated in the ware. The melting heat is applied to the top surface only of the body of glass and gradually penetrates downwardly through the mass by radiation and by the slow heat conductivity of the glass.

The "batch" materials for making glass, consisting mainly of silica sand loosely mixed with various fluxes in comminuted form and sometimes with crushed cold glass termed "cullet", are fed into one end of the melting tank upon the surface of the partially melted glass therein, into which it sinks slowly as it flows therewith by gravity toward and through the feeders at the delivery end of the tank. Some of these batch components, melting at different temperatures or differing in specific gravity, apparently become more or less separated as they fall upon or sink into the melting glass in the tank, are extended lengthwise in the line of flow through the feeder, and become set lengthwise in the ware.

Apparently due to its slow heat conductivity, its varying viscosity, its contamination by clay that has been eroded and washed from the walls of the tank forehearth and feeder conduits, and perhaps to other more or less obscure causes, the glass flows through the melting tank and the feeders in more or less unhomogeneous and sinuous lengthwise extending lines, lanes or laminations of varying temperature, viscosity and composition, which although in closely cohering contact with each other often fail to unite homogeneously. The hotter and more liquid lanes or laminations flow faster than those which are cooler and more viscous.

These contaminations and perhaps other unhomogeneities are the apparent causes of what are well known as "cords" which, having coefficients of thermal expansion differing from that of clear glass, or setting at a different temperature or at different times, cause localized strains in the ware when the latter cools and sets. Some of these strains are not released or removed by present methods of annealing. By the present invention such strains are widely and thinly dispersed and reduced in intensity by initially distributing the glass from the supply body with its skin, cords and contaminations thinly over a wide area, and passing it through a zone of regulated heat to reduce it to and maintain it at the desired softness before and while forming it into mold charges.

Other strains commonly occurring in blown ware made by present methods, even when the glass is free from contaminations and cords, are due to unequal thickness of different portions of its walls, usually resulting from unequal temperature and viscosity of different portions of the plastic mold charges or of their outer skin surfaces, when they reach the blowing operations. Due to un-uniform heating, or to local chilling, the mold charges or their surface skins as now made are often colder and more resistant to stretching at one side or portion than at other sides or portions. The hotter portions yield more quickly and easily than the colder portions to the distending, stretching and thinning action of the blowing pressure, which has no directional guiding force of its own. Being guided in its initial penetration of the glass parison, as well as in the final blowing, only by the relative resistances of the hotter and colder portions, the expanding bubble of blowing air is decentralized toward the hotter portions, thus making some portions of the wall of the expanding parison and of the finished ware thinner than other portions. These varying thicknesses are revealed by gradations in color of different portions of the parisons and also of the finished ware when first removed from their respective molds, the thicker portions remaining red longer than the thinner portions. Such differing portions cool, contract and set at different times, thereby setting up tensional strains between them when all have fully set, which tend to fracture the ware when later subjected to pressure or shock. Such ware is only as strong as its thinnest or weakest portion. Greater thickness elsewhere is a useless waste of glass, even if no strains result therefrom.

Cords and strains in glassware are usually not visible to the unaided eye upon casual inspection. Cords may be revealed by etching the surface of the ware with acids, which attack the homogeneous glass and cords differently, leaving the cords more clearly outlined. Strains may be revealed by vari-colored lines or bands under polariscopic examination of the ware, or by immersion thereof in certain liquids. When glassware containing strains is broken or cracked by accident or in shock or pressure tests, the lines of fracture are usually so nearly coincident with or adjacent to the lines or bands of cords or strains thus revealed as to indicate their causal relation. In ware made by present methods, the lines of cords, strains and fractures almost invariably extend lengthwise of the ware.

The brush marks and wrinkles above referred to are usually visible on the charges as they emerge from the feeder orifice, and are believed to be caused as follows. The glass in direct contact with the colder walls of the tank, feeder conduits and outlets, is somewhat chilled by that contact, forming a flexible and stretchable skin, which flows more slowly than the interior hotter glass, due to its increased viscosity and its tendency to adhere to those walls. Its inner side coheres with the faster moving hotter glass, by which the skin is pulled through the contracted feeder outlet and scored thereby, besides being often unevenly chilled at different portions as it emerges into the outer and much colder air.

In flowing from the tank in lines or lanes converging to and passing through the contracted outlets of the feeders, these skins become corrugated or wrinkled lengthwise of their lines of flow. This wrinkling due to such convergence can be simply demonstrated by forming a ring with the thumb and forefinger, spreading a handkerchief across the top of the ring and then pushing or pulling the center of the handkerchief through the ring. Such surface wrinkles on the charge are usually stretched and smoothed out of the larger diameters of the ware by the blowing distension of the charge, but they frequently remain visible as brush marks, striations, or other blemishes on the surface of the less distended smaller diameters of the ware.

In present methods of feeding molten glass and shaping it into compact mold charges, the glass is intermittently fed from the supply body through a refractory clay outlet ring in a relatively thick column, the diameter of which is often about as large as the diameter of the mold charges to be made, which are successively shaped from short lengths of the thick column as they emerge from the feeder outlet. The initial outer skin, sometimes originating in the melting furnace, and more or less wrinkled, scored and abraded as it flows or is forced through the clay outlets of the feeders, remains the outer skin of the mold charges throughout their formation and conversion into ware, and with its remaining blemishes becomes the outer enamel-like surface of the finished ware.

In the customary methods of making blown ware, that surface or skin is successively, and often unevenly, chilled three times before the ware is blown to final shape, first by contact with the walls of the tank, forehearth and feeder outlets; second, by exposure to the outer air; and third by contact with the walls of the parison mold, all of which delays the final blowing out of the ware by the loss of time required to reheat and soften the trebly and unevenly chilled outer skin to a sufficiently plastic condition for the final blowing. This reheating is effected only by slow conduction and sometimes uneven distribution of heat to the unevenly chilled skin from the hotter glass within it, usually while the blank or parison remains within the parison mold, which meanwhile remains idle, thus entailing loss of time.

In the method of the present invention, the molten glass flows continuously in a relatively small stream of regulated size directly from a supply body into a surrounding zone protected from chilling air, in which the stream is disposed in coils superposed concentrically in tubular form around a substantially vertical axis. The coils and tube are guided concentrically with that axis, preferably by a rotating gathering head, around which the stream is wound as the coils sink vertically by gravity, without exposing their outer surfaces to chilling air or abrading surfaces. Whatever chilled portions the glass may retain from its previous contacts with the walls of the tank and outlet are reheated by its own interior heat, augmented if necessary by suitably disposed and regulated burners. This reheating eliminates the first, and avoids the second of the chillings above referred to.

The coils cohere and fuse together as they sink vertically by gravity, forming a tube which is of uniform thickness and is uniformly heated around each circumferential level, although the thickness may vary at different levels.

The charges are formed successively from the lower portions of the tube by turning its lower end inwardly and backwardly within itself until approximately enough glass has accumulated to form the interior body of the next mold charge. The accumulation, fused within the descending tube, is then pushed down therewith at the regulated rate and to the extent required to form a mold charge of the desired shape and size, which is then severed. Whatever cords or contaminations may be in the stream extend lengthwise thereof, and by the coiling of the stream are disposed peripherally in the mold charges, so that whatever strains in the ware result therefrom are likewise peripherally disposed in its walls instead of extending lengthwise thereof.

In the accompanying drawings, Figure 1 is a front elevation partly in section, showing a preferred apparatus for carrying out the method of the present invention;

Fig. 2 is a side elevation in section looking from the right in Fig. 1, showing the gathering head and heating chamber of Fig. 1 and the outlet of a furnace or forehearth from which the glass flows to the gathering head;

Figs. 3, 4, 5 and 6 are sectional elevations of the gathering head and plunger of Fig. 1, showing four successive stages in the formation of a mold charge;

Fig. 7 is a side elevation of the lower end of a gathering head in section, showing diagrammatically the vacuum space vacated in the glass by upward movement of the plunger;

Fig. 8 is a sectional elevation and Fig. 9 is a plan view in section, taken at the line 9—9 of Fig. 8, showing a modified form of gathering head to which the glass flows in a divided stream;

Figs. 10 and 11 are elevations in section of another modified form of gathering head by which the mold charges are formed by pneumatic pressure, without the aid of a plunger;

Fig. 12 is a side elevation of a reservoir air tank and its adjuncts, two of which may respectively be used for producing the desired degrees of vacuum and pressure in the gathering heads, instead of using the air pumping apparatus shown in Fig. 1;

Fig. 13 is a sectional view of a duplex air valve, which may be used for regulating and maintaining the desired degree of vacuum in the vacuum tank or of pressure in the pressure tank of Fig. 12;

Fig. 14 is an elevation of a bottle made according to the present invention, illustrating the peripheral disposal of the bands of glass and the wide dispersion of the strain therein;

Fig. 15 is a sectional elevation of a modified form of gathering head, to which the glass flows from the supply body in independent streams.

In a preferred embodiment of this invention shown in Figs. 1 and 2, the glass is flowed from a supply body 10 (Fig. 2) in a stream 8 of regulable uniform thickness, which is wound in superposed coils, built up in tubular form around a hollow gathering head 1 made of refractory material, with its external contour substantially concentric and coaxial with its vertical axis. The head may be cylindrical, or tapering toward its lower end as shown, and may be provided with an annular shoulder 13 to receive and level the coils, or the stream may be directed against any tapering or cylindrical annulus of the head, either tangentially as shown in the drawings or more radially toward the axis of the head. The hollow interior 26 of the head when utilized as a husbanding cavity terminates in an outlet at the bottom of the head, and to enable the charges to be formed by extraneously applied vacuum and air pressure if desired, it is provided with an air passage 31 extending through its upper end.

For rotating the head to wind the coils of glass around it, the head is removably clamped in a rotary carrier 2 mounted in bearings 3, which may be anti-friction bearings, and may be rotated at the desired rate in any convenient way from a suitable changeable speed motor, as for example by a chain 4 meshing with the sprocket teeth 5 of the carrier.

This method of flowing and coiling the glass in tubular form provides the latter with a new outer surface, which is or may be protected from being chilled until the completed mold charges are delivered to molds, in which it becomes the outer surface of the finished ware. For such protection against chilling the stream, coils and tube, they may be enclosed by surrounding heat from suitably disposed and regulated burners. Preferably they are so enclosed by a chill excluding, heat confining chamber 6, which may be made of or covered on its outer side with heat insulating materials to more completely confine the heat of the stream and coils and tube, and protect adjacent outside parts therefrom. Being thus enclosed, whatever chilled skins or abrasions the glass may retain from its previous contact with the walls of the tank or outlets are reheated and softened more or less by its own interior heat.

The interior of the chamber is continuously heated by the hot glass constantly passing through it, and it may be further heated by suitable burners. In Fig. 1 it is shown to be heated by an annular burner 7 which may be adapted to partially close the bottom of the chamber to more completely confine the heat, leaving suitable clearance for the circulation of heat and for the thickest flow of glass around and below the gathering head.

The burner or burners and the gathering head may be made removable, so that other burners, or other gathering heads, such as those shown in Figs. 8, 10 and 15, may be substituted. The burner flames or other heating media surround the outside of the glass as it sinks downwardly by gravity on the outside of the gathering head, rotation of which further facilitates uniform heating of the glass. Either the flames or the chamber or both may be extended downwardly far enough to protect or heat the entire surface of the mold charges, as shown by dot-and-dash lines in Fig. 1, to prevent chilling and to insure sufficient softening and fusing together of the coils. When so extended below the level of the shears 9, the side walls of the chamber may be provided with openings 49 through which the shear blades may be projected into the chamber to sever the successive charge when shaped, and be immediately withdrawn and cooled outside of the chamber by water sprays or otherwise during the intervals between severances. The top cover of the chamber 6 is made in halves to facilitate removal, and its sides may be made in hinged or removable sections for disassembling, or opening for observation of the operations inside the chamber, or for opening to graduated extents to regulate the release of heat from the chamber when desired.

The molten glass flows from the supply body 10, Fig. 2, which may be in a furnace or forehearth, through a spout or spouts 11, directly into the chamber 6, in one or more continuous streams of regulated uniform size according to the weight of the charges to be made, without being exposed to chilling temperatures. The spout or spouts may be adjustable, and also be removable for the substitution of other spouts of different sizes or shapes. The volume of flow may be regulated in any well-known way, as by an adjustable gate 12 or gates. The stream is preferably directed in a tangential relation to one side of the rotating gathering head 1 around which the stream is wound in continuous superposed concentric coils or layers of uniform thickness which cohere together and form a tubular sheath 27 within which the gathering head serves as a vertical guiding and centering member.

As the coils or layers are continuously added to the top of the cohering tubular column, the latter settles downwardly by its weight on the outside of the gathering head, through an enclosing zone of heat, which may be regulated so as to fuse the cohering coils or layers together, and bring them to the desired uniform conditions of temperature and softness best suited for uniform distention of the mold charges into the wall of the finished ware. They may be kept hot enough to prevent the formation of any new surface skin; or the heat may be reduced or regulated to allow of the controlled formation of a new skin of the desired character. Such a skin may be allowed to form on the surface of the mold charge only, by its exposure to the air after passing below a shortened chamber 6 as in Fig. 2, and reducing or eliminating the heat directed to the charge below the chamber.

The artificial preshaping of the suspended charges to fit the mold cavities, or to approximate the shapes of the articles to be made, is effected by means applied in the interior of the tube, such as a mechanical plunger, or by varying vacuum and air pressure, or by the coordinated use of both, as hereinafter described, without bringing the outer surfaces of the coils or tubes or charges into contact with any chilling or abrasive substance. The successive charges when shaped are severed by shears 9 operated in any known way, and are delivered to molds or other means by which they are expanded to their final shape by blowing, or by any customary means or methods. In the case of blown ware the uniform viscosity of all portions of each mold charge made by this method offers equal resistance on all sides to the stretching and distending action of the blowing pressure, thus guiding and centralizing the blow bubble in its penetration of the glass while counter-blowing the blank in the parison mold and while final blowing in the blow mold, thereby making the wall of the ware of the uniform thickness or thinness desired.

As shown in Fig. 1, a plunger 14 of refractory material for shaping the mold charge is mounted for reciprocation within the gathering head, having its upper end fixed in a shaft 15 adjustably held in an arm 17 mounted for sliding movement on the guide rod or rods 18 fixed in the frame 19. The arm 17 is connected by a link 20 to a slot 21 in a cam lever 22 pivoted at 23 in the frame 19, to operate the plunger in the desired cycle by a suitably shaped cam 24 which is removably fixed on the shaft 25, in order that the cam may be adjusted around the shaft for timing its cycle, or that other cams of desired shapes for changing the cycle may be substituted. The length of the plunger stroke may be changed by adjusting the link 20 in the slot 21, and the range of its stroke relative to the gathering head 1 may be changed by adjusting the shaft 15 vertically in the thrust collars 47 without changing the length of stroke.

The plunger acts upon the glass partly by adhesion and partly by displacement. A film or coating of glass adheres to and moves with the plunger, and a similar film or lining adheres to the outlet or lower portion of the interior wall of the cavity 26. The lower end of the plunger, even when it projects below the gathering head, is always submerged in a body of displaceable glass of sufficient thickness to hermetically seal that end, and the cavity outlet against the penetration of air, thus enabling the submerged end to continuously serve as a displacement pump piston in the glass, since it is the glass rather than the gathering head which constitutes the effective pump cylinder within which the plunger acts as a piston to retain continuous control of the movement of the glass. Upward movements of the piston tend to create a complete vacuum in the vacated space 50 diagrammatically represented in Fig. 7, allowing the external differential atmospheric pressure to push the displaceable glass into and fill that space as fast as it is vacated by the plunger. For the purpose of this illustration, the normal action of the differential pressure is assumed to be temporarily suspended in Fig. 7.

For making small charges for relatively light weight ware, which constitutes a large proportion of all ware made, relatively short movements of the plunger in the glass below the head, and the husbanding capacity of the vacated space 50, Fig. 7, may be sufficient, without utilizing the husbanding cavity 26, or the auxiliary aid of extraneously applied vacuum and air pressure. For such uses that cavity and the air duct 31 may be omitted or the outlet of the cavity may be made only enough larger than the plunger to admit an annulus of glass thick enough to form an air-tight packing around the plunger within the outlet, but not thick enough to allow appreciable flow of glass to or from the cavity 26.

This would allow the differential air pressure to fill the vacuum space 50 with the glass around and below it, without opposition from any flow of glass from the cavity 26 either by gravity or under differential air pressure above it.

The plunger may be used selectively either as a rotating or non-rotating member, and the changes may be quickly made from either of those uses to the other. As shown in Fig. 1, the plunger is rotated by a spline 16 detachably seated in the shaft 15, and sliding therewith through a splineway in the rotating carrier 2. The clamp screw 45 on the arm 17 is loosened to allow the shaft 15, supported by the collars 47, to rotate in the arm 17. To change to non-rotating use of the plunger, the spline 16 is removed by pulling it endwise out of its seat, and the screw 45 may also be tightened if desired, to clamp the shaft in the arm 17.

Figs. 1 to 6 show successive stages in the shaping of the mold charges. As or before each preceding mold charge is severed, as shown in Fig. 6, the plunger is moved upwardly, thus forming a vacuum in the space 50 vacated by the plunger, and thereby allowing differential atmospheric pressure on the outside of the glass to form a neck therein if desired, and to push the glass into and fill the vacated space 50, Fig. 7, as indicated by the arrows 51 in Figs. 6 and 3. That pressure may be timed to lift the glass away from the shears as it is severed. After severance, the remaining tube of glass 27 continues to settle down on the outside of the gathering head as it is turned inwardly and upwardly within itself and the gathering head as indicated by the arrows 62 in Fig. 3, continuously sealing the tube and the outlet of the head 1. Enough of the glass is thus pushed up within the tube, or into the husbanding cavity 26 of the head 1, as may be required to fill out the body of the next mold charge to the desired size and shape.

When the plunger reaches the top of its stroke, and the desired volume of husbanded glass has accumulated within or below the gathering head, the discharge and shaping of a mold charge begins. Forced discharge, whether by a plunger or otherwise, may be delayed long enough to allow enough of the glass to flow down by gravity to make small charges, or to make the lower ends of larger charges more or less pointed. Husbanded glass from the cavity 26 and its encasing portion of the tube or sheath 27 fuse together as they meet below the outlet of the gathering head and are moved downwardly together by the plunger or air pressure at the sometimes varying rates required for producing mold charges of the desired contour. The charge is then severed far enough below the end of the plunger to leave the new end of the tube hermetically sealed for the next operation, as shown in Figs. 6 and 3.

The disposal of the glass in superposed coils around and concentric with a vertical axis allows the coils to remain concentric and coaxial therewith as they sink vertically by gravity and are converted into mold charges which are suspended in the same concentric and coaxial relation. The uniform thickness of the coils allows the tube to be built up in substantially level layers, thus making the tube wall of the uniform thickness conducive to uniform heating. Plungers when used are preferably likewise disposed coaxially within the coils and tube and mold charges. Thus whatever grain, cords, contaminations or other faults the glass may contain are disposed in the ware in substantially the peripheral concentric and coaxial relation in which they are initially disposed in the coils and tube, so that lines or bands of strain that may result are similarly disposed and widely and evenly dispersed peripherally around the ware approximately as shown in Fig. 14, instead of being localized lengthwise thereof.

Inasmuch as the coils, tube and suspended charges naturally sink vertically by gravity, any appreciable inclination of the axis of the coils or gathering head or other guiding means from a vertical position would allow the coils and tube of soft glass to creep or slump spirally around the head toward its inclined lower side and out of concentric relation with its axis, thus making the wall thicker on that side than on the upper side, besides inclining the axis of the tube out of coaxial alignment with the naturally vertical axis of the suspended mold charges, and thereby bending and further distorting the tube in converting it into charges.

The larger volume of glass required for heavier charges may be supplied by feeding two or more charges to the head through two or more different spouts directed to different circumferential portions of the same annular shoulder or outside zone of the head, thus building up the tube more rapidly or in increased volume with a plurality of interlaid coils, thereby increasing the rate of production.

For making such heavier charges, or increasing the rate of production, the plunger action may be augmented by extraneously applied vacuum of air pressure, preferably by both of those means alternately cooperating with the plunger, as indicated by arrows 52 in Fig. 5, which indicate downward air pressure on the glass, and by arrows 53 in Figs. 3 and 6, which indicate upward exhaustion of the air to produce the desired degree of vacuum above the glass. The vacuum and air pressure, whether used without a plunger or as an auxiliary thereto, may be supplied from an air pump as in Fig. 1, or from tanks as shown in Figs. 12 and 13 and described below.

As shown in Fig. 1, an air chamber 30 communicates with the interior of the gathering head through a passage 31 therein and passages 48 in the carrier 2, and is connected by a pipe 32 with a pump chamber 33, in which a reciprocating piston 34 is mounted and is connected by the rod 35 with a slot in the cam lever 36 operated by the removable cam 37 on the shaft 38, which is rotated in synchronism with the cam shaft 25. Upward movements of the air piston reduce, and downward movements increase, the differential air pressure on the surface of the glass in the gathering head, as indicated by the arrows 52 and 53 in Figs. 3 to 6. Following each of these movements normal atmospheric pressure is preferably restored in the gathering head through a port 39 leading from the pump chamber 33 to the atmosphere, which is opened and closed by the valve 40 operated through the rod 41 and cam lever 42 by the cam 43, so as to definitely terminate the effects of each movement and to avoid progressive building up of vacuum or pressure in the head. By adjusting the upper end of the rod 35 in the slot of the lever 36, the length of the piston stroke and the volume and pressure of air pumped may be increased or reduced. The vacuum and air pressure thus applied in the gathering head can be varied at any part of its cycle of action by suitably shaping the cam 37, or by substituting different cams.

The cam levers 36 and 42 are connected by a spring 44 or by separate springs, to hold their cam rollers in contact with their respective cams if required. A spring may also be applied to the cam lever 22, to hold its roller in contact with the cam 24, if the weight of the connected parts is not sufficient to insure such continued contact.

Figs. 8 and 9 illustrate a modified hollow gathering head 55 which may be substituted for the head 1 in the apparatus of Fig. 1, particularly for making larger sizes of ware. In this modification the flow of glass is divided, into two parts one of which is directed through the apertures 56 to the inside of the head and becomes the interior body of the next charge. Enough of the glass overflows the level outer rim of the head 55 down and around the outside thereof to form a tubular sheath 57 of the desired thickness. The size of the gathering head 55 and of its cavity 59 may be large enough for the largest charges they are to make, to avoid filling the cavity full enough to obstruct the flow of air through the air passage 54 when the vacuum and air pressure are used. The contour of the shoulder 58, or the relative positions of the spout and the head, may be adapted to apportion the divided flow between the exterior and interior of the gathering head with sufficient accuracy, since the weight of the mold charges is determined by the regulated volume of flow through the spout 11 independently of its apportionment in the divided streams.

Fig. 15 illustrates a further modification, differing from that of Figs. 8 and 9 mainly in the respect that the glass flows from the supply body to the gathering head 101 through separate spouts 102, 103 in independent streams 104, 105, the volume flow of which may be independently regulated by separate adjustable gates or valves, to more definitely and accurately apportion their flow between the outside and inside of the gathering head, on which the annular ridge 106 keeps the streams separated. The volume of flow may be increased, and any desired proportion thereof may be fed to the outer side of the head in two or more streams through additional spouts, with a consequent increase in production. Any of the gathering heads and their spouts may be enclosed within heated chambers of suitable sizes, as in Fig. 1, or may be heated by suitably disposed burners.

In the modification shown in Figs. 10 and 11, the pneumatic gathering head 60 is of a form which may be substituted in the carrier 2 for the gathering head 1 of Figs. 1 to 6, and fed by the same spout 11 while surrounded by the same heating chamber 6 of Fig. 1. In that arrangement, the plunger 14 of Fig. 1 and its shaft 15 are removed, the opening thus left in the top plate of the air chamber 30 is plugged, and the plunger operating mechanism is disconnected or removed, so that the desired formation of the mold charges is effected by the alternate action of vacuum and air pressures produced by the movements of the air pump piston 34 of Fig. 1. The arrows 29 indicate the directions of the flow of air in the cavity 63 of the head.

As a further modification, the sub and superatmospheric pressures may be supplied to the gathering head 60 from reservoir tanks like that shown in Fig. 12, instead of by the pump mechanism of Fig. 1. In this modification, in addition to removing the plunger 14 and its adjuncts, the air chamber 30 of Fig. 1 may be removed from its seat on the frame 3 and replaced thereon by the cover plate 64 of Fig. 10, provided with any well-known 4-way air valve 65, operated through a lever 66 and its connection 67 by a cam, not shown. Turning the valve to different positions connects the interior of the gathering head through pipes 68 with a tank 71, Fig. 12, in which a vacuum or variable subatmospheric pressure is maintained by well-known means, or through a pipe 69 with a similar tank in which air is maintained at superatmospheric pressure by well-known means. By turning the valve to an opening at 70 leading to the outer air, atmospheric pressure may be periodically restored within the cavity 63 as described above in connection with the head 1 of Fig. 1.

The degrees of vacuum and the pressure maintained in the respective tanks may be varied by suitable well-known relief valves. Fig. 13 shows in section a duplex relief valve 73, one of which may be connected in the piping from each tank. Each valve casing contains two independently operating ball valves 74 and 75 held to their seats by compression springs 76, the pressure of which is varied by adjusting screws 77 and 78 respectively. The ball 74 closes the air inlet 79, and the ball 75 closes the air outlet 80. When the adjusted degree of vacuum in the vacuum tank is exceeded, the increased differential pressure at the inlet 79 raises the ball 74 enough to admit sufficient air to restore the tank vacuum to the desired degree. Similarly, excess pressure in the pressure tank raises the ball 75 enough to release the excess, which escapes through the open outlet 81.

The air pressure and vacuum tanks 71, each provided with a relief valve 73, may also be used in coordination with the plunger mechanisms of Fig. 1, in place of the air pump mechanism of that figure. For such use, the air pipe 32 may be detached from the air chamber 30 and replaced thereon by a 4-way valve like the valve 65 of Fig. 10, connected with the respective tanks and operated by a cam in synchronism with the plunger 14 as above described.

The volume of flow to the gathering head 60 may be increased, with a consequent increase of production, by the use of additional spouts, as described above in connection with Fig. 1.

In any of the above described embodiments of the invention, the action of the plunger, when used, and of the vacuum and air pressure when used, may be substantially as described in connection with Figs. 1 to 6 inclusive. Any plunger used may be provided with a spline for rotating it by its carrier, as shown in Fig. 1.

Fig. 14 shows a bottle 90 illustrating how clay contaminations or other grain contained in the glass are by the method of the present invention widely separated and dispersed over the entire length and width of the lines or bands 91 instead of being concentrated in a longitudinally extending band as in the case of the same bottle when formed by prior art methods of glass containing the same length and amount of clay contaminations or other grain, thereby avoiding resultant strains in the ware or reducing their localized intensity. Due to the lengthwise stretching and thinning of the mold charge in its conversion into the bottle, the spiral lines of grain are more widely separated, dispersed and inclined from their initial nearly horizontal and level positions. Whatever length of lines or bands 91 may occur, will be proportionate to the initial length of the cords or contaminations which cause them.

Modifications of the method and apparatus of this invention, other than those above described and shown in the drawings, may be made without departing from the spirit and scope of the invention, as indicated in the appended claims.

I claim as my invention:

1. The method of converting molten glass into plastic mold charges, which consists in flowing the glass from a supply body thereof in an extending stream, winding the stream in continuous spiral coils superposed in the form of a tube around a substantially vertical axis, and shaping the tube while still plastic into successive mold charges and while retaining the glass therein in approximately the spiral and peripheral relation that is occupied in the coils, whereby whatever cords, contaminations or other elements of strength or weakness the glass may contain will be extended and more widely dispersed in relatively thin lines, bands or striations extending peripherally around the mold charges and in a relatively wide area extending lengthwise of the charges, and will by customary methods of expanding plastic mold charges into glassware be widely dispersed and more thinly disposed peripherally in the ware.

2. The method of forming mold charges of molten glass which consists in flowing the glass in a continuous stream, coiling the stream in continuous layers superposed in the form of a tube around a substantially vertical axis, and guiding the tube concentrically with that axis, as it sinks by gravity and successively forming and separating mold charges of artificial shapes from successive lower portions of the tube.

3. The method of forming mold charges of molten glass, which consists in flowing the glass in a stream, disposing the stream in layers superposed in the form of a tube around a substantially vertical axis, fusing the layers together, guiding the tube as it sinks axially, closing its lower end to hermetically seal it while successively forming mold charges of artificial shapes from that end by alternate application of vacuum and pressure within the sealed tube, and severing each mold charge through a closed portion of the tube leaving its new lower end hermetically sealed to enable the pneumatic operation to be repeated on the succeeding charge.

4. The method of converting molten glass into a mold charge which consists in flowing the glass in a stream, disposing and guiding the stream in superposed coils concentrically around a substantially vertical axis, fusing the coils together into the form of a tube as they sink axially by gravity, and forming the lower portion thereof into a mold charge of regulated artificial shape, while maintaining the glass with its contaminations and grain in substantially the peripheral relation in the charge that they occupied in the coils.

5. The method of converting molten glass into mold charges which consists in flowing the glass in a stream disposed and guided in superposed coils around a substantially vertical axis, heating and fusing the coils together in the form of a tube and successively converting the lower portion of the tube into mold charges of artificial shape, by turning the lower end of the tube inwardly and backwardly within itself to hermetically seal that end and to accumulate enough of it within the tube to form the interior of the charges by differential atmospheric pressure induced by periodically applying regulated degrees of vacuum within the tube, and alternately therewith applying therein regulated degrees of pressure to discharge and shape the respective mold charges.

6. The method of converting molten glass into a mold charge which consists in feeding the glass in a stream disposed and guided in superposed coils around a substantially vertical axis, heating and fusing the coils together into a tube as they sink axially by gravity, while forming the lower portion of the tube into a mold charge of regulated artificial shape suitable for conversion into an article of glassware, by turning enough of the lower end of the tube inwardly and upwardly within the tube to hermetically seal its lower end and to fill out the body of the next mold charge.

7. The method of converting molten glass into mold charges which consists in flowing the glass in a stream, winding the stream in superposed substantially concentric coils around a gathering head rotating on a substantially vertical axis, fusing the coils together as they sink vertically by gravity, and forming them into successive mold charges of regulated artificial shapes suitable for conversion into glassware articles.

8. The method of converting molten glass into a mold charge which consists in flowing the glass in a stream, winding the stream in superposed substantially concentric coils around a conical gathering head converging toward its lower end and rotating on a substantially vertical axis, fusing the coils together in the form of a tube as they sink vertically by gravity while forming the lower portion of the tube into a mold charge of regulated shape suitable for conversion into an article of glassware.

9. The method of converting molten glass into a mold charge which consists in flowing the glass in a stream, winding the stream in superposed coils around a hollow ended gathering head rotating on a substantially vertical axis, fusing the coils together into the form of a tube as they sink vertically by gravity through a surrounding zone of uniform heat, while forming the lower portion thereof into a mold charge of artificial shape by turning its lower end inwardly and partly into the interior of the gathering head until enough glass is thus accumulated to fill out the desired mold charge, then forcing the accumulation downwardly within and with the surrounding tube at rates suited for producing a charge of the desired contour.

10. The method of converting molten glass into a mold charge which consists in flowing the glass in a stream, winding the stream in superposed substantially horizontal coils around a hollow ended gathering head rotating on a substantially vertical axis, uniformly heating and fusing the coils together into the form of a tube as they sink vertically by gravity, while forming the lower portion thereof into mold charge of artificial shape by turning its end inwardly and partly into the interior of the gathering head by suction applied within the glass, until enough glass is thus accumulated to fill out the desired mold charge, then forcing the accumulation downwardly within and with the surrounding tube at rates suited for producing a charge of the desired contour.

11. The method of converting molten glass into a mold charge which consists in flowing the glass in two separate streams, winding one of the streams in superposed layers around a hollow gathering head rotating on a substantially vertical axis, fusing the layers together as they sink vertically by gravity, while flowing the other stream into the interior of the head to form the interior of the mold charge, fusing the two bodies of glass together as they unite below the gathering head, and forming therefrom a suspended mold charge of artificial shape.

12. The method of converting molten glass into mold charges which consists in flowing the glass in two separate streams of independently regulated size, winding one of the streams in superposed coils around a hollow gathering head rotating on a substantially vertical axis, fusing the coils together as they sink vertically by gravity, while flowing the other stream into the interior of the head to form the interior of the mold charge, fusing the two bodies together as they unite below the gathering head, and successively forming therefrom suspended mold charges of artificial shape.

13. The combination in glass feeding apparatus of a vertically disposed gathering head, means for flowing a stream of glass of regulated size from a supply body thereof and winding it around the head in superposed coils, means for softening and fusing the coils together in the form of a vertical tube as they sink vertically on the head by gravity, and means applied within the tube for successively forming its lower portion into solid mold charges of artificial shape.

14. The combination in glass feeding apparatus, of a vertically disposed gathering head, means for flowing a stream of glass of regulated size from a supply body thereof and winding it around the head in a series of substantially horizontal superposed coils, means for softening and fusing the coils together in the form of a vertical tube as they sink vertically on the head by gravity, means for forming the lower portion of the tube into a solid mold charge of artificial shape while attached to and in alignment with the tube, and means for severing the charge therefrom below the level of the tubular portion, to leave the new lower end of the tube hermetically closed.

15. The combination in glass feeding apparatus, of a gathering head having an external contour substantially concentric with a vertical axis, means for flowing a stream of glass of regulated size from a supply body thereof to the head, means for winding the stream around the head in a succession of substantially horizontal superposed coils, means for fusing the coils together in the form of a tube as they settle vertically by gravity on and below the gathering head, and means for applying subatmospheric and superatmospheric pressure through the head to the tube to successively form its lower portion into mold charges.

16. The combination in glass feeding apparatus, of a gathering head having an external contour substantially concentric with a vertical axis, means for flowing a stream of glass of regulated size from a supply body thereof to the head, means for winding the stream around the head in a succession of substantially horizontal superposed coils, means for fusing the coils together in the form of a tube as they settle vertically by gravity on and below the gathering head, and means for applying subatmospheric and superatmospheric pressure through the head to the tube to successively form its lower portion into mold charges, including means for restoring atmospheric pressure in the head between the said applications.

17. The combination in glass feeding apparatus, of a vertically disposed gathering head, means for flowing a stream of glass from a supply body thereof to the head without exposure to chilling air, means for winding the stream around the head in a series of substantially horizontal superposed coils, means for fusing the coils together in the form of a tube as they sink vertically on and below the head by gravity, a reciprocating plunger extending into the glass and serving as a pump piston therein to form a mold charge therefrom by turning the lower end of the tube inwardly and upwardly within itself until enough glass is thus accumulated to form the interior body of the charge, then discharging the accumulation with its surrounding tube at rates suited for shaping them into a mold charge of the desired contour, and means for severing the charge far enough below the end of the plunger to leave that end hermetically sealed in the remaining glass for the next charge forming operation.

18. The combination in glass feeding apparatus, of a gathering head mounted for rotation on a substantially vertical axis, a heat confining chamber surrounding the head, means for rotating the head, a spout for directing a stream of glass of regulated size from the supply body thereof to the head in a relation thereto which allows the stream to be wound around the head in a succession of substantially horizontal superposed coils, and means for applying regulated extraneous heat in the chamber and around the head and spout.

19. The combination in glass feeding apparatus, of a gathering head mounted for rotation on a substantially vertical axis, means for rotating the head, means for flowing a stream of glass from a supply body thereof to the head in a relation thereto which allows the stream to wind around the rotating head in a series of substantially horizontal superposed coils, means for fusing the coils together in the form of a tube as they sink vertically by gravity, and means including a reciprocating plunger extending within the tube for forming its lower portion into mold charges of artificial shape by applications of suction and pressure within the tube while keeping its lower end hermetically sealed.

20. The combination in glass feeding apparatus, of a gathering head mounted for rotation on a substantially vertical axis, means for rotating the head, a spout for directing a stream of glass of regulated size from a supply body thereof to the head in a relation thereto which allows the stream to wind around the rotating head in a series of substantially horizontal superposed coils, means for heating the coils and fusing them together in the form of a tube of uniform wall thickness as they sink vertically by gravity, and means for forming the lower portion of the tube into mold charges of artificial shape by applications of suction and pressure within the tube while keeping its lower end hermetically sealed.

21. The combination in glass feeding apparatus, of a hollow gathering head mounted for rotation on a substantially vertical axis, means for rotating the head, means for directing a stream of glass from a supply body thereof to the head in a relation thereto which allows the stream to be wound around the rotating head in substantially horizontal superposed coils, means for heating and fusing the coils together in the form of a tube as they settle vertically by gravity on and below the gathering head, and means applied within the head to turn the lower end of the tube upwardly within the head until enough glass has thus accumulated to form the internal body of a mold charge, and discharging the accumulation within and with its surrounding portion of the tube to form a mold charge suspended therefrom.

22. The combination in glass feeding apparatus, of a gathering head mounted for rotation on a substantially vertical axis, and having an external contour concentric with said axis, including an annular shoulder, means for rotating the head, means for flowing a stream of glass of regulated size from a supply body thereof upon the shoulder in a succession of substantially horizontal superposed coils, means for fusing the coils together in the form of a tube as they settle vertically by gravity on and below the gathering head, and means applied through the head to the tube for forming its lower portion into solid mold charges while such charges are suspended in axial alignment with the tube.

23. The combination in glass feeding apparatus, of a hollow gathering head mounted for rotation on a substantially vertical axis, means for rotating the head, means for directing a stream of glass of regulated size from a supply body thereof to the head in a relation thereto which allows the stream to be wound around the head in a succession of substantially horizontal superposed coils, means for heating and fusing the coils together in the form of a tube as they settle vertically by gravity on and below the gathering head, and a reciprocating plunger extending into the head coaxially therewith and serving as a pump piston in the glass to alternately pump a regulated quota thereof into the hollow head and discharge it therefrom with a surrounding portion of the tube at a rate suited for forming the discharge into mold charges of artificial shape.

24. The combination in glass feeding apparatus, of a hollow gathering head mounted for rotation on a substantially vertical axis, means for rotating the head, means for feeding a stream of glass of regulated size from a supply body thereof to the head in a relation thereto which allows the stream to be wound around the head in a succession of substantially horizontal superposed coils, means for heating and fusing the coils together in the form of a tube as they settle vertically by gravity on and below the gathering head, a reciprocating plunger extending into the head coaxially therewith and serving as a pump piston in the glass to alternately pump a regulated quota thereof into the hollow head and discharge it therefrom with a surrounding portion of the tube at a rate suited for forming the discharge into mold charges of artificial shape, and means for rotating the plunger.

25. The combination in glass feeding apparatus, of a hollow gathering head mounted for rotation on a substantially vertical axis, means for rotating the head, means for feeding a stream of glass of regulated size from a supply body thereof to the head in a relation thereto which allows the stream to be wound around the head in a succession of substantially horizontal superposed coils, means for heating and fusing the coils together in the form of a tube as they settle vertically by gravity on and below the gathering head, a reciprocating plunger extending through the head coaxially therewith and serving as a pump piston in the glass to alternately pump a measured quota thereof into the hollow head and discharge it therefrom with a surrounding portion of the tube at a rate suited for forming the discharge into mold charges of artificial shape, and means for rotating the plunger, including a driving connection between the plunger and head.

26. The combination in glass feeding apparatus, of a hollow gathering head mounted for rotation on a substantially vertical axis, means for rotating the head, means for flowing a stream of glass of regulated size from a supply body thereof to the head in a relation thereto which allows the stream to be wound around the head in a succession of substantially horizontal superposed coils, means for heating and fusing the coils together in the form of a tube as they settle vertically by gravity on and below the gathering head, a reciprocating plunger extending through the head coaxially therewith and serving as a pump piston in the glass to alternately pump a measured quota thereof into the hollow head and discharge it therefrom with a surrounding portion of the tube at a rate suited for forming the discharge into mold charges of artificial shape, and means for rotating the plunger with the head, including a detachable sliding connection between the plunger and the means for rotating the head.

27. The combination in glass feeding apparatus, of a gathering head mounted for rotation on a substantially vertical axis, means for rotating the head, means for feeding a stream of glass of regulated size from a supply body thereof to the head in a relation thereto which allows the stream to be wound around the head in a succession of substantially horizontal superposed coils, means for fusing the coils together in the form of a tube settling vertically by gravity on and below the gathering head, and means for alternately applying suction and air pressure within the tube to first allow enough of the lower end of the tube to be pushed inwardly and upwardly within the tube by differential air pressure to form the interior body of a mold charge, and then discharging that body along with enough of the surrounding tube to complete the charge.

28. The combination in glass feeding apparatus, of a gathering head mounted for rotation on a substantially vertical axis, means for rotating the head, means for feeding a stream of glass of regulated size from the supply body thereof to the head in a relation thereto which allows the stream to be wound around the head in a succession of substantially horizontal superposed coils, means for fusing the coils together in the form of a tube as they settle vertically by gravity on and below the gathering head, a reciprocating plunger extending into the head and serving as a pump piston in the glass, and extraneous auxiliary means coordinated with the piston action of the plunger to apply suction and air pressure within the tube to push enough of the lower end of the tube inwardly and upwardly within the tube to form the interior body of a mold charge, and then discharge that body along with enough of the surrounding tube to complete the charge.

29. The method of obtaining mold charges of molten glass which comprises flowing molten glass from an upper portion of a supply body in a container in a freely falling stream, intercepting and continuously forming the stream into a continuous vertically disposed tube of descending molten glass, turning glass of the lower end portion of the tube inwardly toward the axis and partly into the interior of the tube to hermetically seal the lower end of the tube and to form successive solid masses of glass in suspension from and axial alignment with said tube, and severing mold charges from said successive solid masses.

30. The method of converting molten glass into plastic mold charges which consists in flowing the glass from a supply body thereof in an extended stream of substantially uniform thickness, winding the stream in continuous coils superposed in tubular form around a substantially vertical axis to avoid substantially circumferential flow of the coils of the tube away from their initial position of contact with each other, forming and artificially shaping mold charges in suspension from and in axial alignment with the tube as the latter sinks by gravity, thereby distributing and maintaining in substantially concentric relation in the charges whatever cords, contaminations, striations or other elements of strength or weakness may be in the glass.

31. The method of making a mold charge of molten glass which consists in flowing the glass in a stream, winding the stream in coils superposed in the form of a tube around and concentrically with a substantially vertical axis, so that in sinking vertically by gravity the glass in the tube remains concentric with and uniformly distributed around said axis, artificially shaping the mold charge from the lower end of the tube while suspended therefrom, and separating the charge from the tube.

32. The method of feeding molten glass in mold charges which comprises coiling a stream of molten glass from a supply body around a feeding implement to form thereon a continuous vertical sheath of molten glass descending thereon by gravity, applying periodic pulsations inside of the sheath to the glass at the lower end thereof to form the latter into successive mold charges of artificial shape suspended from the sheath, and severing the successive mold charges therefrom.

WILLIAM T. HONISS.